(12) United States Patent  (10) Patent No.: US 11,548,447 B2
Sutton (45) Date of Patent: Jan. 10, 2023

(54) TRUCK BED DIVIDER ASSEMBLY

(71) Applicant: HINTERLAND, LLC, Dunedin, FL (US)

(72) Inventor: Christopher Sutton, Dunedin, FL (US)

( * ) Notice: Subject to any disclaimer, the term of this patent is extended or adjusted under 35 U.S.C. 154(b) by 68 days.

(21) Appl. No.: 17/331,875

(22) Filed: May 27, 2021

(65) Prior Publication Data

US 2022/0379815 A1 Dec. 1, 2022

(51) Int. Cl.
*B60R 9/06* (2006.01)
*B60P 1/00* (2006.01)
*B60P 7/135* (2006.01)

(52) U.S. Cl.
CPC .............. *B60R 9/06* (2013.01); *B60P 1/003* (2013.01); *B60P 7/135* (2013.01)

(58) Field of Classification Search
CPC ............ B60R 9/06; B60P 1/003; B60P 7/135
See application file for complete search history.

(56) References Cited

U.S. PATENT DOCUMENTS

| | | | | |
|---|---|---|---|---|
| 5,829,945 A * | 11/1998 | Stanley | .................. | B60P 1/433 414/522 |
| 5,964,492 A * | 10/1999 | Lyon | ........................ | B60R 9/00 224/404 |
| 6,065,792 A * | 5/2000 | Sciullo | .................... | B60P 1/003 414/522 |
| 6,328,364 B1 * | 12/2001 | Darbishire | .............. | B60P 1/003 296/39.2 |
| 10,137,839 B1 * | 11/2018 | Kelley, Jr. | .................. | B60R 7/02 |
| 2006/0181101 A1 * | 8/2006 | Reynolds | .................. | B60R 7/02 224/543 |
| 2008/0136206 A1 * | 6/2008 | McKelvey | .............. | B60P 1/003 296/26.09 |
| 2012/0111911 A1 * | 5/2012 | Rempe | ...................... | B60R 9/10 224/403 |
| 2014/0169906 A1 * | 6/2014 | Hibbard | .................. | B60P 7/135 410/121 |
| 2018/0281699 A1 * | 10/2018 | Furniss | ..................... | B60R 9/06 |

* cited by examiner

*Primary Examiner* — Brian D Nash
(74) *Attorney, Agent, or Firm* — Mark C. Johnson; Johnson Dalal

(57) ABSTRACT

A truck bed divider assembly with a horizontal dividing member operably configured to extend and retract longitudinally to directly couple with sidewalls within a truck bed and with a vertical dividing member disposed in a substantially perpendicular orientation with respect to the horizontal dividing member and operably configured to selectively, removably, and lockably couple to the horizontal dividing member with one or more fasteners and to linearly translate on the horizontal dividing member while coupled thereto, thereby enabling organization within the bed of a truck or other vehicle.

19 Claims, 7 Drawing Sheets

TRUCK BED DIVIDER ASSEMBLY

FIELD OF THE INVENTION

The present invention relates generally to vehicle dividers and, more particularly, relates to a divider for truck beds.

BACKGROUND OF THE INVENTION

Many users desire to organize their personal or other belongings within the bed of a truck or other vehicle (generally referred to herein as a "vehicle"). Specifically, the vehicle may include a bed with a bed bottom wall having a surface where belongings or other items are stored and/or transported the vehicle. The bed may include a plurality of bed sidewalls surrounding the bed bottom wall and defines a bed volume. One of the sidewalls of the bed is called a tailgate, and is typically operably configured to rotate along a tailgate rotation path to provide easy and effective access to the bed volume. The tailgate is also operably configured to be placed in a parallel configuration with respect to the bed bottom wall.

Some known organizational devices are designed and configured to be placed within the truck bed, but they either fail to provide effective coupling of the device to the truck bed and/or fail to provide users storage versatility. For example, some known organizational devices are configured to use the device weight to support the device onto the bed bottom wall, which problematically causes the device to often shift during transportation of the vehicle. Some known organizational devices are designed to be mechanically coupled to the truck bed or specifically sized and shaped to couple with an area of the truck bed, but these devices typically require significant amount of time to install or maneuver and/or have limited placement locations. Some known organizational devices are designed to keep cargo or personal items from shifting forward and backward, but not side-to-side when there is space left in the truck bed.

Therefore, a need exists to overcome the problems with the prior art as discussed above.

SUMMARY OF THE INVENTION

The invention provides a truck bed divider assembly that overcomes the hereinafore-mentioned disadvantages of the heretofore-known devices and methods of this general type and that effectively and efficiently enables users to couple the divider to the truck bed and maneuver it in various positions and configurations to store personal and other belongings of users. Additional embodiments of the present invention also enable effective and efficient coupling and uncoupling of accessories, e.g., fishing rod holder(s), to the truck bed divider.

With the foregoing and other objects in view, there is provided, in accordance with the invention truck bed divider operably configured to be utilized in combination with a vehicle having a bed with a bed bottom wall, a plurality of bed sidewalls surrounding the bed bottom wall, and defining a bed volume, the vehicle having a tailgate operably configured to rotate along a tailgate rotation path and configured to be placed in a parallel configuration with respect to the bed bottom wall, and defining one of the plurality of bed sidewalls. The improvement includes a truck bed divider assembly having a horizontal dividing member with a left end, a right end opposing the left end of the horizontal dividing member, a horizontal member length separating the left and right ends of the horizontal dividing member, at least one leg having a support surface selectively removably couplable to the bed bottom wall, at least one horizontal frame element with a front surface defining a horizontal rail channel disposed continuously along the horizontal member length, a rear surface opposing the front surface of the at least one horizontal frame element, and at least one tensioning member with an elastically deformable surface defining the left end of the horizontal dividing member and operably configured to selectively modulate the horizontal member length. The assembly also includes a vertical dividing member with a left end, a right end opposing the left end of the vertical dividing member, a vertical member length separating the left and right ends of the vertical dividing member, at least one leg having a support surface selectively removably couplable to the bed bottom wall, and at least one horizontal frame element disposed in a substantially perpendicular orientation with respect to the at least one horizontal frame element of the horizontal dividing member, with a front surface defining a horizontal rail channel disposed continuously along the vertical member length, and with a rear surface opposing the front surface of the at least one horizontal frame element of the vertical dividing member. The vertical dividing member is selectively, removably, and lockably coupled to the horizontal dividing member with at least one fastener and operably configured to linearly translate within the horizontal rail channel of the at least one horizontal frame element of the horizontal dividing member.

In accordance with another feature, an embodiment of the present invention includes the horizontal dividing member having an upper horizontal frame element defining an upper end of the horizontal dividing member and a lower horizontal frame element defining a lower end of the horizontal dividing member opposing the upper end of the horizontal dividing member, the upper and lower horizontal frame elements each disposed in a spaced-apart and parallel configuration with one another, defining a continuous horizontal gap therein between. Further, a horizontal member height separates the upper end of the horizontal dividing member 116 and the lower end of the horizontal dividing member, the continuous horizontal gap having a gap length that is greater than 50% of the horizontal member height.

In accordance with yet another feature, an embodiment of the present invention also includes at least one outrigger member directly coupled to the lower horizontal frame element in an unobstructing configuration with respect to the continuous horizontal gap and extending outwardly away from the rear surface of the horizontal dividing member and having a support surface parallel with the support surface of the least one leg.

In accordance with a further feature of the present invention, the upper horizontal frame element includes the horizontal rail channel disposed continuously along the horizontal member length and the lower horizontal frame element includes a horizontal rail channel disposed continuously along the horizontal member length, the vertical dividing member selectively, removably, and is lockably coupled to the upper and lower horizontal frame elements of the horizontal dividing member respectively with a fastener and operably configured to linearly translate within the horizontal rail channels of the upper and lower horizontal frame elements of the horizontal dividing member.

In accordance with an additional feature of the present invention, the fastener is operably configured to translate and frictionally engage with the upper and lower horizontal frame elements.

In accordance with an exemplary feature, an embodiment of the present invention also includes a plurality of tensioning members each with an elastically deformable surface, operably configured to selectively and independently modulate the horizontal member length, and coupled to opposing ends of the upper horizontal frame element and opposing ends of the lower horizontal frame element, respectively, to define the left and right ends of the horizontal dividing member.

In accordance with an additional feature of the present invention, the continuous horizontal gap uniformly spans longitudinally greater than 50% of the horizontal member length.

In accordance with another feature, an embodiment of the present invention also includes the horizontal dividing member having a left vertical frame element coupled to the upper and lower horizontal frame elements of the horizontal dividing member and including a first leg having the support surface selectively removably couplable to the bed bottom wall and a right vertical frame element coupled to the upper and lower horizontal frame elements of the horizontal dividing member and including a second leg having a support surface selectively removably couplable to the bed bottom wall, wherein the continuous horizontal gap uniformly spans greater than 50% of the horizontal member length and separates the left and right vertical frame elements.

In accordance with yet another feature of the present invention, the horizontal rail channel is recessed within the at least one horizontal frame element and spans longitudinally greater than 75% of the horizontal length.

In accordance with an additional feature, an embodiment of the present invention also includes the vertical dividing member having an upper horizontal frame element defining an upper end of the vertical dividing member and a lower horizontal frame element defining a lower end of the vertical dividing member opposing the upper end of the vertical dividing member, wherein the upper and lower horizontal frame elements of the vertical dividing member each disposed in a spaced-apart and parallel configuration with one another, defining a continuous vertical gap therein between. Further, a vertical member height separates the upper end of the vertical dividing member and the lower end of the vertical dividing member, the continuous vertical gap having a gap length that is greater than 50% of the vertical member height.

In accordance with another feature of the present invention, the upper horizontal frame element of the vertical dividing member includes a left horizontal rail channel disposed continuously along the front surface thereon and along the vertical member length, the upper horizontal frame element of the vertical dividing member includes a right horizontal rail channel disposed continuously along the rear surface thereon and along the vertical member length. The lower horizontal frame element of the vertical dividing member includes a left horizontal rail channel disposed continuously along the front surface thereon and along the vertical member length, and the lower horizontal frame element of the vertical dividing member includes a right horizontal rail channel disposed continuously along the rear surface thereon and along the vertical member length.

In accordance with an exemplary feature of the present invention, the continuous vertical gap uniformly spans longitudinally greater than 50% of the vertical member length.

In accordance with a further feature, an embodiment of the present invention also includes the vertical dividing member having a left vertical frame element coupled to the upper and lower horizontal frame elements of the vertical dividing member and a right vertical frame element coupled to the upper and lower horizontal frame elements of the vertical dividing member and including the at least one leg having the support surface, wherein the continuous vertical gap uniformly spans greater than 50% of the vertical member length and separates the left and right vertical frame elements of the vertical dividing member.

Also in accordance with the present invention, a truck bed divider assembly is disclosed that includes a horizontal dividing member with a left end, a right end opposing the left end of the horizontal dividing member, and a horizontal member length separating the left and right ends of the horizontal dividing member, at least one leg having a support surface selectively removably couplable to the bed bottom wall of a vehicle, an upper horizontal frame element defining an upper end of the horizontal dividing member, a lower horizontal frame element defining a lower end of the horizontal dividing member opposing the upper end of the horizontal dividing member, the upper and lower horizontal frame elements each disposed in a spaced-apart and parallel configuration with one another, defining a continuous horizontal gap therein between, with a front surface defining a horizontal rail channel disposed continuously along the horizontal member length, and with a rear surface opposing the front surface thereon, a horizontal member height separating the upper end of the horizontal dividing member and the lower end of the horizontal dividing member, wherein the continuous horizontal gap has a gap length that is greater than 50% of the horizontal member height, and at least one tensioning member with an elastically deformable surface defining the left end of the horizontal dividing member and operably configured to selectively modulate the horizontal member length. Further, the assembly includes a vertical dividing member with a left end, a right end opposing the left end of the vertical dividing member, a vertical member length separating the left and right ends of the vertical dividing member, at least one leg having a support surface selectively removably couplable to the bed bottom wall of the vehicle, and at least one horizontal frame element disposed in a substantially perpendicular orientation with respect to the upper and lower horizontal frame elements and with a front surface defining a horizontal rail channel disposed continuously along the vertical member length, and with a rear surface opposing the front surface of the at least one horizontal frame element of the vertical dividing member, the vertical dividing member selectively, removably, and lockably coupled to the upper and lower horizontal frame elements with a plurality of fasteners and operably configured to linearly translate within the horizontal rail channels of the upper and lower horizontal frame elements of the horizontal dividing member.

Although the invention is illustrated and described herein as embodied in a truck bed divider assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description. As used herein, the term "wall" is intended broadly to encompass continuous structures, as well as, separate structures that are coupled together so as to form a substantially continuous external surface.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the device and/or from one side to another side of the device, e.g., left end to right end of the device or referring structure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
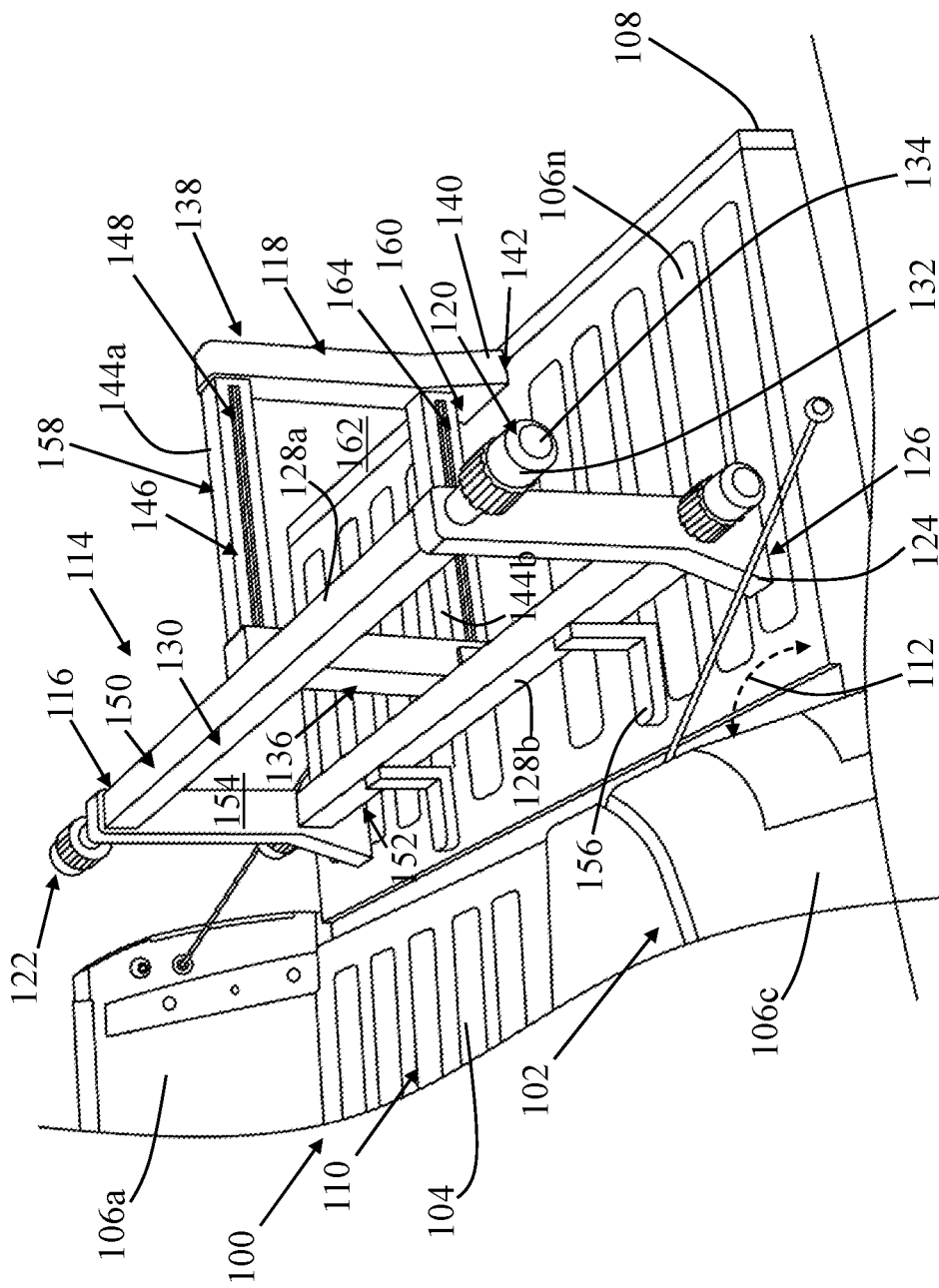
FIG. 1 is a side perspective view of a truck bed divider coupled to the bed of a truck in accordance with one embodiment of the present invention.
Figure 2:
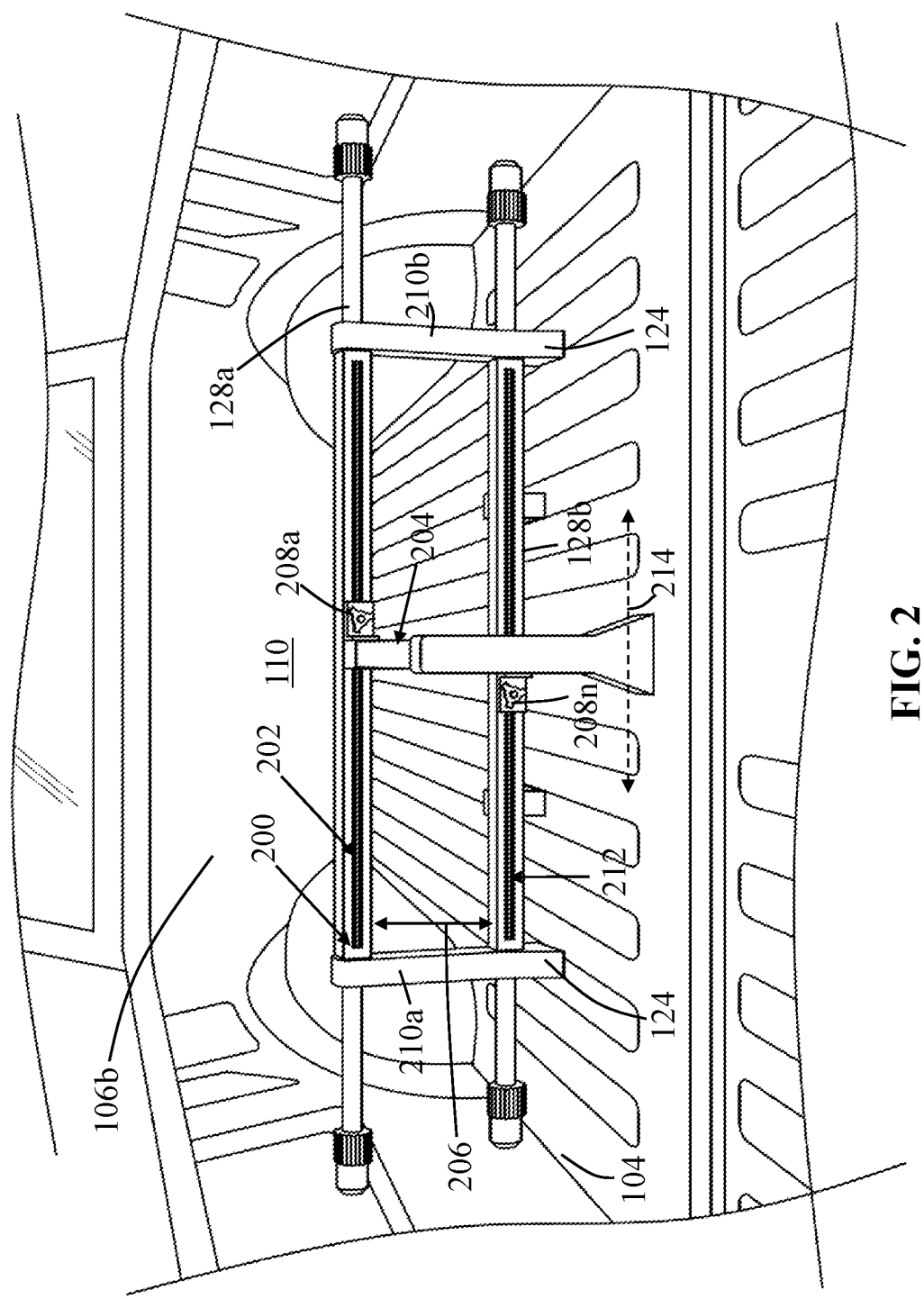
FIG. 2 is a front perspective view of the truck bed divider coupled to the bed of a truck in accordance with one embodiment of the present invention.
Figure 3:
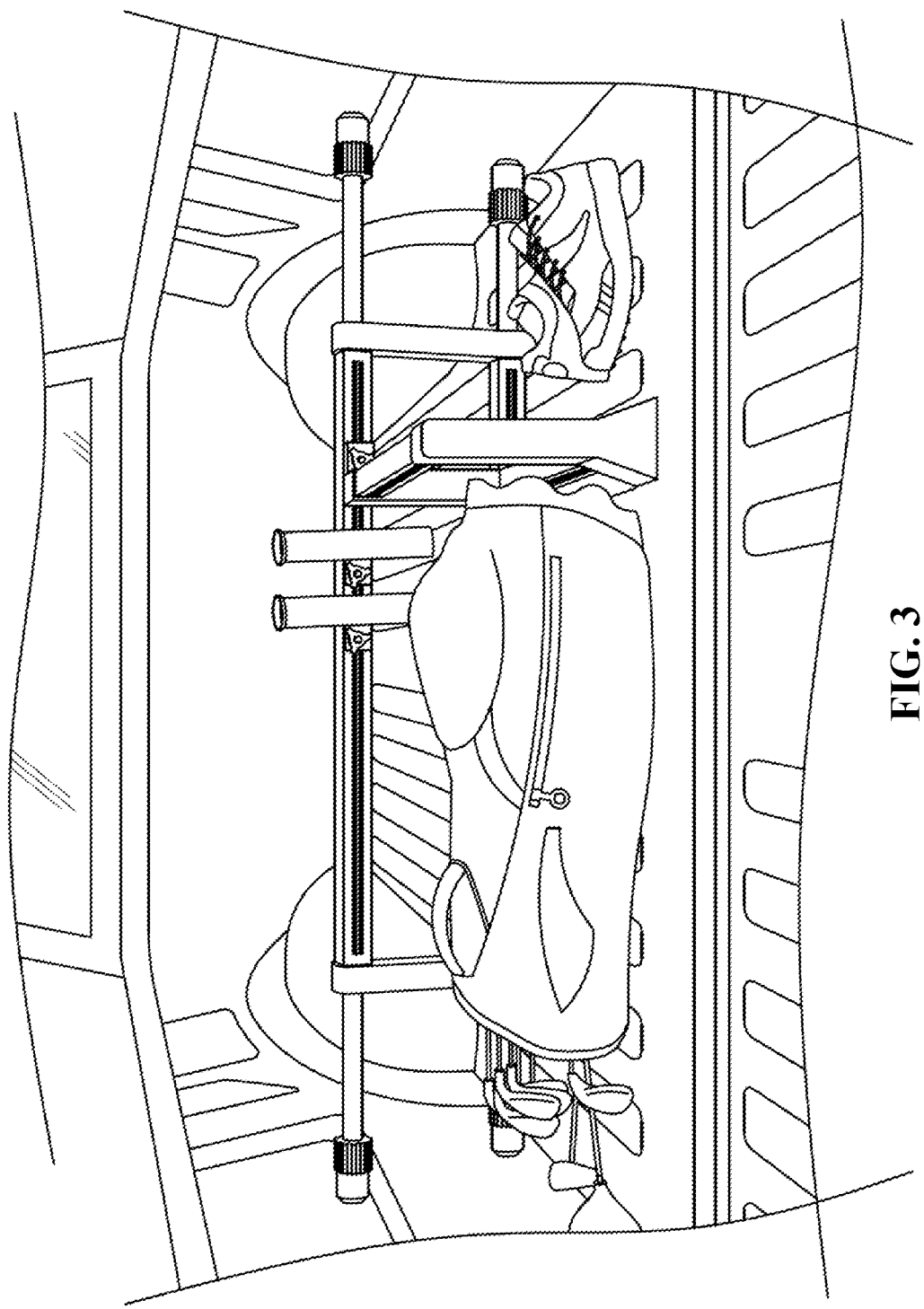
FIG. 3 is a front perspective view of the truck bed divider coupled to the bed of a truck and organizing personal belongings in accordance with one embodiment of the present invention.
Figure 4:
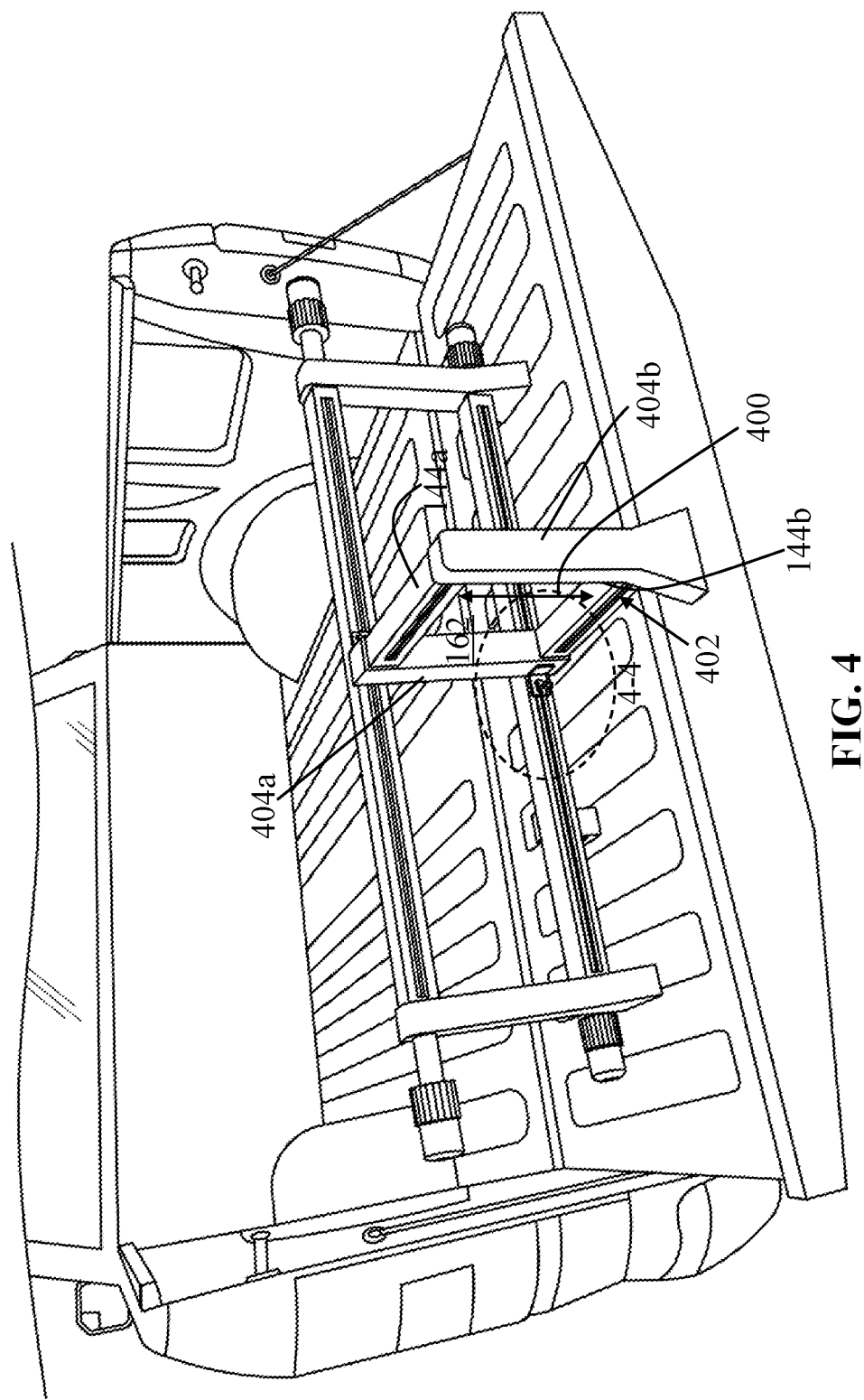
FIG. 4 is a side perspective view of the truck bed divider coupled to the bed of a truck in accordance with one embodiment of the present invention.
Figure 5:
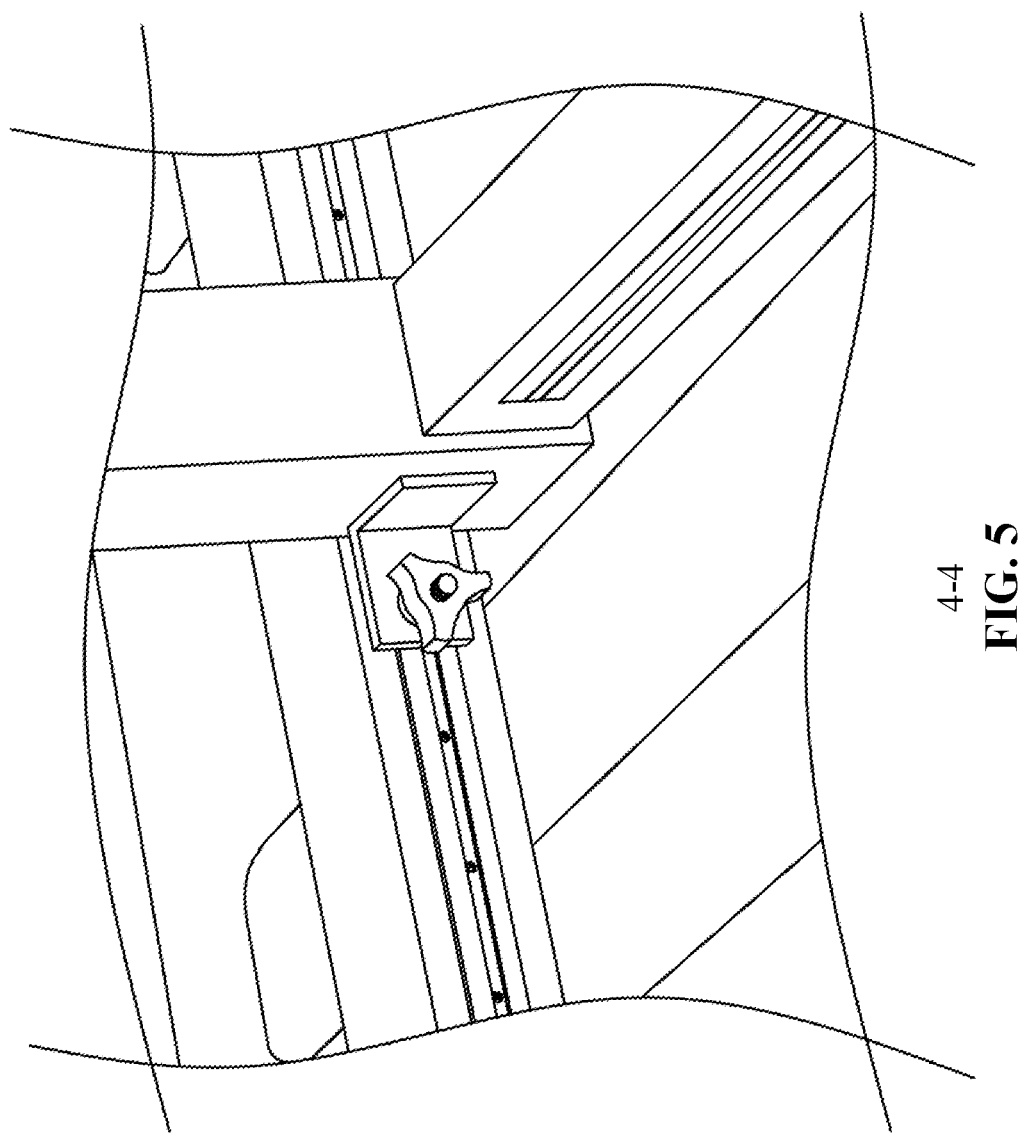
FIG. 5 is a close-up view of the truck bed divider coupled to the bed of a truck in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient truck bed divider that effectively, efficiently, and safely enables users to organize personal belongings and other belongings within the bed of a vehicle, including a truck. Embodiments of the invention also provide users the ability to selectively modify the divider to fit and couple to almost any sized and configured truck bed.

Referring now to FIGS. 1-5, one embodiment of the present invention is shown in various views. FIGS. 1-5 show several advantageous features of the present invention, but, as will be described below and as depicted for example in FIGS. 6-7, the invention can be provided in several shapes, sizes, combinations of features and components, and varying numbers and functions of the components. The first example of a truck bed divider assembly 114, as shown in FIGS. 1-5, includes a horizontal dividing member 116 with a left end 120, a right end 122 opposing the left end 120 of the horizontal dividing member 116, and a horizontal member length separating the left and right ends 120, 122 of the horizontal dividing member 116. Additionally, a vertical dividing member 118 can be seen that includes a left end 136, a right end 138 opposing the left end 136 of the vertical dividing member 118, and a vertical member length separating the left and right ends 136, 138 of the vertical dividing member 118. Both the horizontal dividing member 116 and the vertical dividing member 118 may be of a substantially, yet lightweight material, e.g., aluminum, PVC, etc. that may weigh approximately 10-30 lbs. The light weight of the divider 114, including the horizontal dividing member 116 and the vertical dividing member 118, make it easy for most users to insert and remove the divider into a truck bed (like the bed 102 exemplified in FIG. 1). In one embodiment, the horizontal dividing member 116 and the vertical dividing member 118 are made of hollowed tubing and may be manufactured together as one piece or assembled together with individual components and retained using fastener(s) and/or welding. The horizontal member length may range from approximately 50-80 inches depending on the adjustment by the user and design application. The vertical member length may range from approximately 10-48 inches.

To that end, the divider 114 is generally utilized in combination with a vehicle 100 (e.g., a truck) having a bed 102 with a bed bottom wall 104, a plurality of bed sidewalls 106a-n surrounding the bed bottom wall 104, and defining a bed volume 110. The vehicle 100 may have a tailgate 108 operably configured to rotate along a tailgate rotation path (represented with arrow 112). The tailgate 108 is generally located toward the rear end of the vehicle 100 and is configured to be placed in a parallel configuration with respect to the bed bottom wall 104. The tailgate 108 may also define one of the plurality of bed sidewalls 106a-n. The bed 102 may also include a plurality of wheel wells, recesses, and other shapes and structures that may ordinarily prevent a device from effectively coupling to the bed 102 at most locations within the bed. The present invention, however, overcomes those challenges by providing an effective method of modulating the longitudinal length of the horizontal dividing member 116 and retaining the horizontal dividing member 116 to the bed 102.

The horizontal dividing member 116 may also include one or more leg(s), e.g., like leg 124 depicted in FIG. 1, wherein said leg includes a support surface 126 configured to be selectively removably couplable to the bed bottom wall 104. As seen in the figures, the divider 114 is also beneficial because it enables users to efficiently place, remove, and/or maneuver the divider 114 without any external fasteners or otherwise jeopardizing the integrity of the bed 102. The horizontal dividing member 116 includes at least one horizontal frame element 128a-n, wherein "n" represents any number greater than one. The horizontal frame element(s) 128a-n may each include a front surface 200 (that may be generally planar) and rear surface 130 (that may be generally planar) that opposes the front surface 200.

In one embodiment, the front surface 200 may beneficially define a horizontal rail channel 202 disposed continuously along the horizontal member length, wherein "rail" only identifies that the channel is configured to receive a structure therein. The horizontal rail channel 202 may be enclosed by three sides, may include flanges therein for resisting movement at certain locations, may include openings for inserting and removing a structure inserted within the horizontal rail channel 202, may be of a t-shaped slot or other shape enabling a tongue-and-groove coupling configuration, may be inset or recessed within one or more surfaces of frame element(s), and may include sub-apertures (best seen in FIG. 5) that may be threaded in complementary fashion and/or for receiving a fastener that is used to cause engagement between the structure inserted into the horizontal rail channel 202. The horizontal rail channel 202 may also be inset within the frame element(s) disclosed herein and may be approximately 1×1 dimensioned in inches. The horizontal rail channel 202 may be recessed within the one or more horizontal frame element 128a-n and may beneficially span longitudinally greater than 75% of the horizontal length, thereby giving the user greater versatility in positioning the vertical dividing member 118. The horizontal rail channel 202 also enables different attachments or accessories to be inserted and removed thereon, e.g., fishing rod holders, housings, coolers, etc. In some embodiments, the horizontal rail channel 202 is also defined on an upper end 150, namely a surface thereon, on the rear surface 130 of the horizontal dividing member 116, or on all faces or surfaces of a frame element.

Beneficially, one or more tensioning member(s) 132 are also utilized with the horizontal dividing member 116 to cause effective coupling with the bed 102 of the vehicle 100. Specifically, the tensioning member(s) 132 may be of an elastically deformable surface 134, e.g., a polymeric material such as natural rubber, neoprene, etc., that may define the left end 120 of the horizontal dividing member 116 and is operably configured to selectively modulate the horizontal member length, i.e., expand and contract in length. In one embodiment, the selective modulation is caused from a tongue-and-groove configuration or threaded configuration. In other embodiments, it is caused through use of a telescopic configuration between the frame elements utilized on the horizontal dividing member 116 and one or more nodules (e.g., spring-loaded nodules) that retain the telescopic frame elements in the desired configuration and length.

As seen in FIG. 1, the vertical dividing member 118 also includes one or more leg(s) (e.g., leg 140) that may be cantilevered with respect to the horizontal dividing member 116. The leg 140 may also have a support surface 142 selectively removably couplable to the bed bottom wall 104 and that may be parallel and coplanar with any other support surfaces (e.g., support surface 126) on the divider 114. The vertical dividing member 118 may include one or more horizontal frame element(s) 144a-b, or 144a-n, disposed in a substantially perpendicular orientation with respect to one or more of the horizontal frame element(s) 128a-n of the horizontal dividing member 116. As used herein, "substantially parallel", "substantially perpendicular", "parallel", "perpendicular" shall be all construed as using the term "substantially" and will have a variance of approximately +/−10°.

Similar to the horizontal dividing member 116, the vertical dividing member 118 includes horizontal frame element(s) 144a-n with a front surface 146 defining a horizontal rail channel 148 disposed continuously along the vertical member length, and also includes a rear surface 204 opposing the front surface 146 of the at least one horizontal frame element 144a-n of the vertical dividing member 118. Beneficially, the vertical dividing member 118 is selectively, removably, and lockably coupled (e.g., preventing translation without user intervention) to the horizontal dividing member 116 with at least one fastener 208a-n and operably configured to linearly translate (e.g., in the path represented with arrow 214) within the horizontal rail channel 202 of the at least one horizontal frame element 128a-n of the horizontal dividing member 116. In some embodiments, the horizontal rail channel 202 may also be defined on both sides of the horizontal dividing member 116. Said another way, the horizontal rail channel 202 may defined on both of the rear surface 130 and front surface 200 of the horizontal dividing member 116, such that the user may move (and translate) the vertical dividing member(s) 118 to (and along) either or both sides of the horizontal dividing member 116. Additionally, the user may also desire to completely remove the vertical dividing member 118 from the horizontal dividing member 116 to enable larger belongings or items to be stored within the truck bed 102.

In one embodiment, the horizontal dividing member 116 beneficially includes an upper horizontal frame element 128a defining an upper end 150 of the horizontal dividing member 116 and a lower horizontal frame element 128b defining a lower end 152 of the horizontal dividing member 116 opposing the upper end 150 of the horizontal dividing member 116. The upper and lower horizontal frame elements 128a-b are each disposed in a spaced-apart and parallel configuration with one another, defining a continuous horizontal gap 154 therein between. Furthermore, a horizontal member height can be seen separating the upper end 150 of the horizontal dividing member 116 and the lower end 152 of the horizontal dividing member 116, wherein the continuous horizontal gap 154 has a gap length 206 that is greater than 50% of the horizontal member height. This beneficially enables certain belongings and structures to be inserted through the divider 114 when desired by the user and without having to remove the divider 114 from the bed 102. The horizontal member height is low profile and ranges from approximately 8-14 inches.

In one embodiment, the horizontal dividing member 116 includes one or more outrigger member(s), e.g., outrigger member 156, that is directly coupled to the lower horizontal frame element 128b in an unobstructing configuration with respect to the continuous horizontal gap 154 and extending outwardly away from s and having a support surface parallel with the support surface 126 of the least one leg 124. Said another way, the outrigger member(s) 156 provider greater structural stability of the divider 114, while still unaffecting the storage and carrying of belongings and/or items. In one embodiment, the outrigger member 156 is L-shaped and attached to the rear surface of the lower horizontal frame element 128b using one or more fastener(s).

In one embodiment, the upper horizontal frame element 128a includes the horizontal rail channel 202 disposed continuously along the horizontal member length and the lower horizontal frame element 128b includes a horizontal rail channel 212 disposed continuously along the horizontal member length. As such, the vertical dividing member 118 is operable to continually translate within the horizontal rail channel 202 without having to remove it therefrom. Said another way, the vertical dividing member 118 is selectively, removably, and lockably coupled to the upper and lower horizontal frame elements 128a-b of the horizontal dividing member 116 respectively with one or more fastener(s) 208a-n and operably configured to linearly translate within the horizontal rail channels 202 of the upper and lower horizontal frame elements 128a-b of the horizontal dividing member 116.

Figure 6:
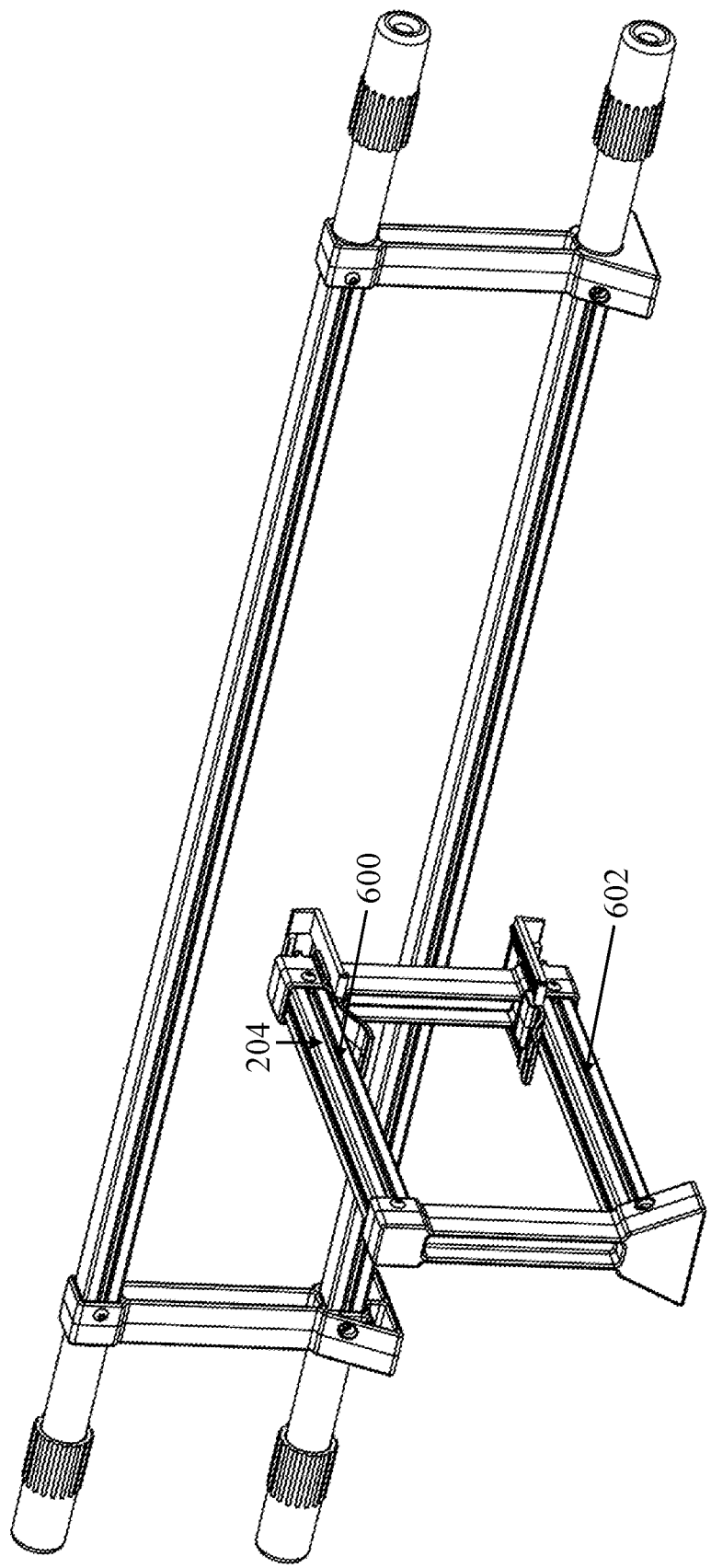
FIG. 6 is a partial exploded view a truck bed divider in accordance with one embodiment of the present invention.
Figure 7:
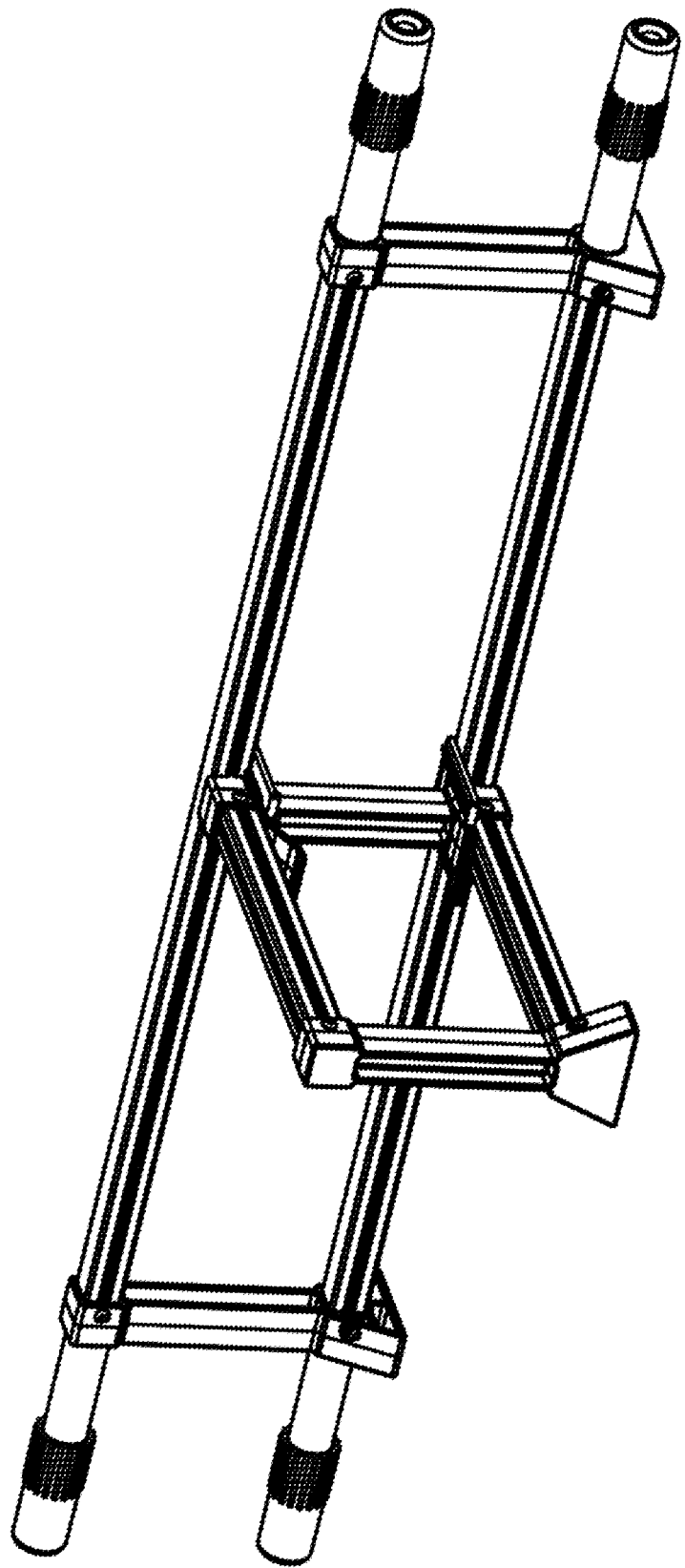
FIG. 7 is a side perspective view the truck bed divider in FIG. 6 with the with a horizontal dividing member and a vertical dividing member coupled thereto in accordance with one embodiment of the present invention.

In one embodiment, as shown in FIGS. 1-5, the fastener(s) 208a-n include a threaded portion and a knob or grip at the head enabling rotation of the threaded portion. In other embodiments, the fastener(s) 208a-n may include, as shown in FIGS. 6-7, a latch with a flange operably configured to engage with the upper and lower horizontal frame elements 128a-b and/or be disposed within the horizontal rail channels 202. To that end, the fastener(s) 208a-n may be beneficially and operably configured to translate and frictionally engage with the upper and lower horizontal frame elements 128a-b.

When the upper and lower horizontal frame elements 128a-b are utilized, a plurality of tensioning members 132 may be utilized, wherein each have an elastically deformable surface 134 operably configured to cause frictional resistance against the bed 102 and not plastically deform when subjected to compression forces ranging from 5-50 lbs. The plurality of tensioning members 132 are operably configured to selectively and independently modulate the horizontal member length, i.e., only one of the plurality of tensioning members 132 may be required move to adjust the horizontal member length. When in use, the plurality of tensioning members 132 are coupled to opposing ends of the upper horizontal frame element 128a and opposing ends of the lower horizontal frame element 128b, respectively, to define the left and right ends 120, 122 of the horizontal dividing member 116, wherein said left and right ends 120, 122 engage and/or directly couple with the bed 102 of the vehicle 100 (as exemplified in the figures). The outer surface of the plurality of tensioning members 132, namely the perimeter surface thereon, may include a plurality of longitudinally oriented ridges to effectuate safe translation and modulation of the horizontal member length.

In one embodiment, the continuous horizontal gap 154 defined by the upper and lower horizontal frame elements 128a-b uniformly spans longitudinally greater than 50% of the horizontal member length. The uniform extension of the continuous horizontal gap 154 (which may also be substantially unobstructed (e.g., greater than 95% of the area) by any object) can be seen best in FIG. 2.

The horizontal dividing member 116 may also include a left vertical frame element 210a coupled to the upper and lower horizontal frame elements 128a-b of the horizontal dividing member 116 and may also include a first leg 124 having the support surface 126 selectively removably couplable to the bed bottom wall 104 and a right vertical frame element 210a coupled to the upper and lower horizontal frame elements 128a-b of the horizontal dividing member 116 and also including a second leg 124 having a support surface 126 selectively removably couplable to the bed bottom wall 104. In one embodiment, the first and second legs 124 may spatially offset (approximately 1 inch) the lower horizontal frame element 128b from the support surfaces thereon to enable flow of liquids (e.g., rain) accumulating within the bed 102 of the vehicle 100. The continuous horizontal gap 154 may also uniformly span greater than 50% of the horizontal member length and may separate the left and right vertical frame elements 210a-b.

Similar to the horizontal dividing member 116, the vertical dividing member 118 may also include an upper horizontal frame element 144a defining an upper end 158 of the vertical dividing member 118 and a lower horizontal frame element 144b defining a lower end 160 of the vertical dividing member 118 opposing the upper end 158 of the vertical dividing member 118. The upper and lower horizontal frame elements 144a-b of the vertical dividing member 118 may be each disposed in a spaced-apart and parallel configuration with one another, defining a continuous vertical gap 162 therein between. Furthermore, the vertical member height separates the upper end 158 of the vertical dividing member 118 and the lower end 160 of the vertical dividing member 118. The continuous vertical gap 162 may also have a gap length 400 that is greater than 50% of the vertical member height for the beneficial reasons described above.

In one embodiment, the upper horizontal frame element 144a of the vertical dividing member 118 includes a left horizontal rail channel 148 disposed continuously along the front surface 146 thereon and along the vertical member length, the upper horizontal frame element 144a of the vertical dividing member 118 includes a right horizontal rail channel 600 disposed continuously along the rear surface 204 thereon and along the vertical member length, the lower horizontal frame element 144b of the vertical dividing member 118 includes a left horizontal rail channel 164 disposed continuously along the front surface 146 thereon and along the vertical member length, and the lower horizontal frame element 144b of the vertical dividing member 118 includes a right horizontal rail channel 602 disposed continuously along the rear surface 204 thereon and along the vertical member length. In other embodiments, an upper surface of the upper horizontal frame element 144a may also include and define a horizontal rail channel 148 disposed continuously along the front surface 146 thereon. In one embodiment, the continuous vertical gap 162 uniformly spans longitudinally greater than 50% of the vertical member length.

In further embodiments, the vertical dividing member 118 includes a left vertical frame element 404*a* coupled to the upper and lower horizontal frame elements 144*a-b* of the vertical dividing member 118 and a right vertical frame element 404*b* coupled to the upper and lower horizontal frame elements 144*a-b* of the vertical dividing member 118 and including the at least one leg 140 having the support surface 142. The continuous vertical gap 162 may uniformly span greater than 50% of the vertical member length and separates the left and right vertical frame elements 404*a-b* of the vertical dividing member 118.

Although a specific order of executing installation and utilization steps have been disclosed, the order of executing the steps may be changed relative to the order shown in certain embodiments. Also, two or more steps shown or disclosed as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. In combination with a vehicle having a bed with a bed bottom wall, a plurality of bed sidewalls surrounding the bed bottom wall, and defining a bed volume, the vehicle having a tailgate operably configured to rotate along a tailgate rotation path and configured to be placed in a parallel configuration with respect to the bed bottom wall, and defining one of the plurality of bed sidewalls, an improvement comprising:
  a truck bed divider assembly with:
    a horizontal dividing member with a left end, a right end opposing the left end of the horizontal dividing member, a horizontal member length separating the left and right ends of the horizontal dividing member, at least one leg having a support surface selectively removably couplable to the bed bottom wall, at least one horizontal frame element with a front surface defining a horizontal rail channel disposed continuously along the horizontal member length, a rear surface opposing the front surface of the at least one horizontal frame element, and at least one tensioning member with an elastically deformable surface defining the left end of the horizontal dividing member and operably configured to selectively modulate the horizontal member length; and
    a vertical dividing member with a left end, a right end opposing the left end of the vertical dividing member, a vertical member length separating the left and right ends of the vertical dividing member, at least one leg having a support surface selectively removably couplable to the bed bottom wall, and at least one horizontal frame element disposed in a substantially perpendicular orientation with respect to the at least one horizontal frame element of the horizontal dividing member, with a front surface defining a horizontal rail channel disposed continuously along the vertical member length, and with a rear surface opposing the front surface of the at least one horizontal frame element of the vertical dividing member, the vertical dividing member selectively, removably, and lockably coupled to the horizontal dividing member with at least one fastener and operably configured to linearly translate within the horizontal rail channel of the at least one horizontal frame element of the horizontal dividing member.

2. The improvement according to claim 1, wherein the horizontal dividing member further comprises:
  an upper horizontal frame element defining an upper end of the horizontal dividing member;
  a lower horizontal frame element defining a lower end of the horizontal dividing member opposing the upper end of the horizontal dividing member, the upper and lower horizontal frame elements each disposed in a spaced-apart and parallel configuration with one another, defining a continuous horizontal gap therein between; and
  a horizontal member height separating the upper end of the horizontal dividing member 116 and the lower end of the horizontal dividing member, the continuous horizontal gap having a gap length that is greater than 50% of the horizontal member height.

3. The improvement according to claim 2, further comprising:
  at least one outrigger member directly coupled to the lower horizontal frame element in an unobstructing configuration with respect to the continuous horizontal gap and extending outwardly away from the rear surface of the horizontal dividing member and having a support surface parallel with the support surface of the least one leg.

4. The improvement according to claim 2, wherein:
  the upper horizontal frame element includes the horizontal rail channel disposed continuously along the horizontal member length and the lower horizontal frame element includes a horizontal rail channel disposed continuously along the horizontal member length, the vertical dividing member selectively, removably, and lockably coupled to the upper and lower horizontal frame elements of the horizontal dividing member respectively with a fastener and operably configured to linearly translate within the horizontal rail channels of the upper and lower horizontal frame elements of the horizontal dividing member.

5. The improvement according to claim 4, wherein:
  the fastener is operably configured to translate and frictionally engage with the upper and lower horizontal frame elements.

6. The improvement according to claim 2, further comprising:
  a plurality of tensioning members each with an elastically deformable surface, operably configured to selectively and independently modulate the horizontal member length, and coupled to opposing ends of the upper horizontal frame element and opposing ends of the lower horizontal frame element, respectively, to define the left and right ends of the horizontal dividing member.

7. The improvement according to claim 2, wherein:
  the continuous horizontal gap uniformly spans longitudinally greater than 50% of the horizontal member length.

8. The improvement according to claim 7, wherein the horizontal dividing member further comprises:
  a left vertical frame element coupled to the upper and lower horizontal frame elements of the horizontal dividing member and including a first leg having the support surface selectively removably couplable to the bed bottom wall; and a right vertical frame element coupled to the upper and lower horizontal frame elements of the horizontal dividing member and including a second leg having a support surface selectively removably couplable to the bed bottom wall, wherein the continuous horizontal gap uniformly spans greater than 50% of the horizontal member length and separates the left and right vertical frame elements.

9. The improvement according to claim 2, wherein the vertical dividing member further comprises:

an upper horizontal frame element defining an upper end of the vertical dividing member;

a lower horizontal frame element defining a lower end of the vertical dividing member opposing the upper end of the vertical dividing member, the upper and lower horizontal frame elements of the vertical dividing member each disposed in a spaced-apart and parallel configuration with one another, defining a continuous vertical gap therein between; and a vertical member height separating the upper end of the vertical dividing member and the lower end of the vertical dividing member, the continuous vertical gap having a gap length that is greater than 50% of the vertical member height.

10. The improvement according to claim 9, wherein:

the upper horizontal frame element of the vertical dividing member includes a left horizontal rail channel disposed continuously along the front surface thereon and along the vertical member length, the upper horizontal frame element of the vertical dividing member includes a right horizontal rail channel disposed continuously along the rear surface thereon and along the vertical member length, the lower horizontal frame element of the vertical dividing member includes a left horizontal rail channel disposed continuously along the front surface thereon and along the vertical member length, and the lower horizontal frame element of the vertical dividing member includes a right horizontal rail channel disposed continuously along the rear surface thereon and along the vertical member length.

11. The improvement according to claim 10, wherein:

the continuous vertical gap uniformly spans longitudinally greater than 50% of the vertical member length.

12. The improvement according to claim 11, wherein the vertical dividing member further comprises:

a left vertical frame element coupled to the upper and lower horizontal frame elements of the vertical dividing member; and a right vertical frame element coupled to the upper and lower horizontal frame elements of the vertical dividing member and including the at least one leg having the support surface, wherein the continuous vertical gap uniformly spans greater than 50% of the vertical member length and separates the left and right vertical frame elements of the vertical dividing member.

13. The improvement according to claim 1, wherein:

the horizontal rail channel is recessed within the at least one horizontal frame element and spans longitudinally greater than 75% of the horizontal length.

14. A truck bed divider assembly comprising a horizontal dividing member with:

a left end, a right end opposing the left end of the horizontal dividing member, and a horizontal member length separating the left and right ends of the horizontal dividing member;

at least one leg having a support surface selectively removably couplable to the bed bottom wall of a vehicle;

an upper horizontal frame element defining an upper end of the horizontal dividing member;

a lower horizontal frame element defining a lower end of the horizontal dividing member opposing the upper end of the horizontal dividing member, the upper and lower horizontal frame elements each disposed in a spaced-apart and parallel configuration with one another, defining a continuous horizontal gap therein between, with a front surface defining a horizontal rail channel disposed continuously along the horizontal member length, and with a rear surface opposing the front surface thereon;

a horizontal member height separating the upper end of the horizontal dividing member and the lower end of the horizontal dividing member, the continuous horizontal gap having a gap length that is greater than 50% of the horizontal member height; and at least one tensioning member with an elastically deformable surface defining the left end of the horizontal dividing member and operably configured to selectively modulate the horizontal member length; and a vertical dividing member with:

a left end, a right end opposing the left end of the vertical dividing member, a vertical member length separating the left and right ends of the vertical dividing member;

at least one leg having a support surface selectively removably couplable to the bed bottom wall of the vehicle; and at least one horizontal frame element disposed in a substantially perpendicular orientation with respect to the upper and lower horizontal frame elements and with a front surface defining a horizontal rail channel disposed continuously along the vertical member length, and with a rear surface opposing the front surface of the at least one horizontal frame element of the vertical dividing member, the vertical dividing member selectively, removably, and lockably coupled to the upper and lower horizontal frame elements with a plurality of fasteners and operably configured to linearly translate within the horizontal rail channels of the upper and lower horizontal frame elements of the horizontal dividing member.

15. The truck bed divider assembly according to claim 14, further comprising:

at least one outrigger member directly coupled to the lower horizontal frame element in an unobstructing configuration with respect to the continuous horizontal gap and extending outwardly away from the rear surface of the horizontal dividing member 116 and having a support surface parallel with the support surface of the least one leg.

16. The truck bed divider assembly according to claim 14, wherein:

the plurality of fasteners are operably configured to translate and frictionally engage with the upper and lower horizontal frame elements.

17. The truck bed divider assembly according to claim 14, further comprising:

a plurality of tensioning members each with an elastically deformable surface, operably configured to selectively and independently modulate the horizontal member length, and coupled to opposing ends of the upper horizontal frame element and opposing ends of the lower horizontal frame element, respectively, to define the left and right ends of the horizontal dividing member.

18. The truck bed divider assembly according to claim 14, wherein:
the continuous horizontal gap uniformly spans longitudinally greater than 50% of the horizontal member length.

19. The truck bed divider assembly according to claim 18, wherein the horizontal dividing member further comprises:
a left vertical frame element coupled to the upper and lower horizontal frame elements of the horizontal dividing member and including a first leg having the support surface selectively removably couplable to the bed bottom wall; and
a right vertical frame element coupled to the upper and lower horizontal frame elements of the horizontal dividing member and including a second leg having a support surface selectively removably couplable to the bed bottom wall, wherein the continuous horizontal gap uniformly spans greater than 50% of the horizontal member length and separates the left and right vertical frame elements.

\* \* \* \* \*